(12) United States Patent
Yavuz et al.

(10) Patent No.: US 9,642,048 B2
(45) Date of Patent: May 2, 2017

(54) MECHANISM TO HANDLE UE ASSISTANCE INFORMATION UPON HANDOVER

(71) Applicant: Telefonaktiebolaget L M Ericsson (publ), Stockholm (SE)

(72) Inventors: Emre Yavuz, Stockholm (SE); Magnus Stattin, Sollentuna (SE); Stefan Wänstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 15 days.

(21) Appl. No.: 14/433,800

(22) PCT Filed: Apr. 11, 2013

(86) PCT No.: PCT/SE2013/050388
§ 371 (c)(1),
(2) Date: Apr. 6, 2015

(87) PCT Pub. No.: WO2014/058373
PCT Pub. Date: Apr. 17, 2014

(65) Prior Publication Data
US 2015/0257049 A1    Sep. 10, 2015

Related U.S. Application Data

(60) Provisional application No. 61/710,999, filed on Oct. 8, 2012.

(51) Int. Cl.
*H04W 36/00* (2009.01)
*H04W 8/20* (2009.01)
(Continued)

(52) U.S. Cl.
CPC ....... *H04W 36/0055* (2013.01); *H04L 43/065* (2013.01); *H04W 8/20* (2013.01); *H04W 56/0025* (2013.01); *H04W 76/046* (2013.01); *H04W 8/24* (2013.01); *H04W 36/0033* (2013.01)

(58) Field of Classification Search
CPC ............ H04W 36/0055; H04W 76/046; H04W 56/0025
See application file for complete search history.

(56) References Cited

PUBLICATIONS

Jihai Han et al.; "Handover in the 3GPP Long Term Evoluting (LTE) Systems", Mobiel Congress (GMC), 2010 Global, IEEE, Piscataway, NJ, USA, Oct. 18, 2010, pp. 1-6.*

(Continued)

*Primary Examiner* — Myron K Wyche
(74) *Attorney, Agent, or Firm* — Coats & Bennett, PLLC

(57) ABSTRACT

The UE, source eNodeB, and/or target eNodeB use one or more existing Radio Resource Control (RRC) messages already available during handover to exchange at least one status report comprising UE assistance information, such as power preference indicators (PPI). The UE and the target eNodeB are thus able to obtain the same up-to-date UE status without any additional signaling. In one embodiment, the UE exchanges a handover preparation status report with the target eNodeB using a first RRC reconfiguration message transmitted from the source eNodeB to the UE, where the handover preparation status report is generated during handover preparation by the target eNodeB. In another embodiment, the UE exchanges a handover execution status report with the target eNodeB during handover execution using a second RRC reconfiguration message transmitted from the UE to the target eNodeB, where the handover execution status report is generated during handover execution. In another embodiment, the UE exchanges multiple status reports with the target eNodeB using multiple RRC reconfiguration messages, where the status reports are generated during handover preparation and handover execution. The handover preparation status report is transmitted from the target eNodeB to the UE and includes the status report as perceived by the target node at the time of handover preparation. The handover execution status report is trans- (Continued)

mitted from the UE to the target eNodeB and includes the status report as stored in the UE memory at the time of handover execution. The first RRC reconfiguration message is a RRC connection reconfiguration message and the second RRC reconfiguration message is a RRC connection reconfiguration complete message.

28 Claims, 3 Drawing Sheets

(51) Int. Cl.
*H04L 12/26* (2006.01)
*H04W 56/00* (2009.01)
*H04W 76/04* (2009.01)
*H04W 8/24* (2009.01)

(56) References Cited

PUBLICATIONS

Catt, et al., "Acquisition of power preference indication upon handover", 3GPP TSG RAN WG2 Meeting #79bis, Bratislava, Slovakia, Oct. 8, 2012, pp. 1-3, R2-124544, 3GPP.

Ericsson, et al., "Discussion on handling UE power preference indication upon handover", 3GPP TSG-EAN WG2 #80, New Orleans, US, Nov. 12, 2012, pp. 1-2, Tdoc R2-125818, 3GPP.

Ericsson, et al., "On FFS for UE assistance fro power preference", 3GPP TSG-EAN WG2 #79bis, Bratislava, Oct. 8, 2012, pp. 1-3, Tdoc R2-124607, 3GPP.

Han, J., et al., "Handover in the 3GPP Long Term Evolution (LTE) Systems", 2010 Global Mobile Congress (GMC), Oct. 18, 2010, pp. 1-6, IEEE.

ZTE Corporation, "Introduction of Power Preference Indication", 3GPP TSG-RAN WG2 Meeting #79, Qingdao, China, Aug. 13-17, 2012, R2-124364, Version 11.0.0, pp. 1-18.

Research in Motion, et al., "LTE RAN Enhancements for Diverse Data Applications", 3GPP Work Item Description, 3GPP TSG RAN Meeting #51, Kansas City, USA, Mar. 15-18, 2011, RP-110454, pp. 1-7.

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 13)," Technical Specification, 3GPP TS 36.331, V13.0.0 (Dec. 2015), pp. 1-507, 3gPP. Valbonne, France.

\* cited by examiner

MECHANISM TO HANDLE UE ASSISTANCE INFORMATION UPON HANDOVER

TECHNICAL FIELD

The invention disclosed herein generally relates to handover of a mobile device between a source node and a target node in wireless networks, and more particularly relates to the synchronization between a mobile device and a target node of the mobile device's status.

BACKGROUND

The 3$^{rd}$ Generation Partnership Project (3GPP) has been developing specifications on the Evolved Universal Terrestrial Radio Access Network (E-UTRAN), which includes the Long Term Evolution (LTE) concepts. In RAN2, a Work Item (WI) on enhancements for Diverse Data Applications (eDDA) has been created in Rel-11 to identify and specify mechanisms to enhance the ability of LTE to handle diverse traffic profiles such as social networking applications. The objective of this WI is to identify improvements that increase the network efficiency, extend UE battery lifetime, reduce signaling overhead, and/or enhance user experience and system performance under such traffic loads.

In one scenario within the context of this WI, efficient power consumption is an important characteristic of a mobile device, which is also referred to herein as a User Equipment (UE). One focus area is to change the UE behavior to reduce its power consumption whenever possible. In previous releases of the specification, timers were introduced to enable switching from a connected mode to an idle mode once the timers expire and when there is no data to send. Further, discontinuous reception (DRX) mode was introduced for LTE in 3GPP standards to conserve battery power when the UE remains in the connected mode. There is a wide range of configuration settings available for the DRX parameters that can serve for different types of services, e.g., VoIP, gaming, web browsing, video telephony, etc.

A base station, which is also referred to herein as an eNB, sets various settings for the UE, e.g., the DRX reception mode configuration. There may be scenarios, however, in which the UE has information that is not available at the eNB. Therefore, assistance information provided by the UE to the eNB is considered useful to the eNB. In many scenarios, the UE sends assistance information by sending one or more of a set of predefined values to an eNB. Such assistance information may take the form of a status report, where the predefined values e.g., indicate the priority of a certain service that the UE requests, report certain problems that the UE experiences which the eNB cannot otherwise be aware of, or state the UE's preference for a certain type of connection configuration. The eNB may or may not act upon requests identified by received assistance information. If the eNB decides to act, it will reconfigure the UE connection accordingly. The resulting reconfiguration will be valid until the next connection reconfiguration.

Frequent transmission of such status reports may cause excessive signaling in the network. Avoiding such excessive signaling enables the network to utilize its resources more efficiently, and thus to provide better service. To that end, UE may be restrained from frequent and/or repetitive transmission of the status report. Frequent transmissions may be prevented with a prohibit timer. Repetitive transmissions may be avoided by preventing the UE from sending a status report unless there has been a change to the assistance information.

While such measures effectively reduce the signaling within the network during normal operations, they are not always effective during handover of the UE from a source eNB to a target eNB. Thus, there remains a need for effectively communicating assistance information responsive to a handover decision without increasing the signaling required for such communications.

SUMMARY

Accordingly, a mobile device, a source node, and/or a target node use one or more existing Radio Resource Control (RRC) messages already available during handover to exchange at least one status report. In so doing, the mobile device and the target node are able to obtain the same mobile device status without any additional signaling. In one embodiment, the mobile device exchanges a handover preparation status report with the target node using a first RRC reconfiguration message, where the handover preparation status report is generated during handover preparation. In another embodiment, the mobile device exchanges a handover execution status report with the target node using a second RRC reconfiguration message, where the handover execution status report is generated during handover execution. In another embodiment, the mobile device exchanges multiple status reports with the target node using multiple RRC reconfiguration messages, where the status reports are generated during handover preparation and handover execution. As used herein the "RRC reconfiguration message" comprises RRC_Connection_Reconfiguration and/or RRC_Connection_Reconfiguration messages.

An exemplary method executed by a mobile device comprises a method executed by the mobile device responsive to a handover decision regarding handover of the mobile device from a source node to a target node in a wireless network. The method includes exchanging at least one status report between the mobile device and the target node responsive to the handover decision using at least one Radio Resource Control (RRC) reconfiguration message, where the status report indicates a status of the mobile device. The method also includes synchronizing a first status of the mobile device stored in a memory in the mobile device with a second status of the mobile device stored in a memory in the target node based on the exchanged at least one status report.

An exemplary mobile device in a wireless network comprises a transceiver, a memory, and a processing circuit. The transceiver is configured to exchange at least one status report between the mobile device and a target node in the wireless network responsive to a handover decision using at least one Radio Resource Control (RRC) reconfiguration message. The status report indicates a status of the mobile device. The handover decision represents a decision to handover the mobile device from a service node to the target node. The memory is configured to store a first status of the mobile device. The processing circuit is configured to synchronize the first status of the mobile device with a second status of the mobile device stored in a memory of the target node based on the exchanged at least one status report.

An exemplary method executed by a network node comprises a method executed by the network node responsive to a handover decision regarding handover of a mobile device from a source node to a target node in a wireless network. The method includes exchanging at least one status report between the mobile device and the target node responsive to the handover decision using at least one Radio Resource Control (RRC) reconfiguration message, where the status report indicates a status of the mobile device. The method also includes enabling synchronization between a first status of the mobile device stored in a memory in the mobile device and a second status of the mobile device stored in a memory in the target node based on the exchanged status report(s).

An exemplary network node comprises a processing circuit and at least one of a transceiver and a network interface. The transceiver and/or network interface is/are configured to exchange at least one status report between a mobile device and a target node responsive to a handover decision using at least one Radio Resource Control (RRC) reconfiguration message. The status report indicates a status of the mobile device, and the handover decision represents a decision to handover the mobile device from a source node to the target node. The processing circuit is configured to enable synchronization between a first status of the mobile device stored in a memory in the mobile device and a second status of the mobile device stored in a memory in the target node based on the exchanged status report(s).

DETAILED DESCRIPTION

Frequent transmission of status reports from a transmitting device to a receiving network node in a wireless network may cause excessive signaling in the network. Avoiding such excessive signaling enables the network to utilize its resources more efficiently, and thus to provide better service. Handover of the transmitting device from a source receiving node to a target receiving node, however, presents a special set of circumstances that ultimately require the status report to be synchronized at both the transmitting device and the target receiving node upon handover completion. Conventional techniques directed at addressing the excessive signaling problem, e.g., a prohibit timer and/or repetitive transmission prohibitions, do not always enable this synchronization to occur upon handover completion. To address this problem, the solution disclosed herein uses existing handover messages to exchange the UE status report(s) between the target eNB and the UE. Thus, the solution disclosed herein avoids unwanted excessive signaling while also avoiding a possible mismatch between the status report in the transmitting device and the target receiving node after handover. Throughout this document, UE, source eNB, and target eNB are used as labels for the transmitting device, source receiving node and target receiving node, respectively. It will be appreciated, however, that the solution disclosed herein applies to any transmitting and receiving devices going through handover in a wireless network.

Figure 1:
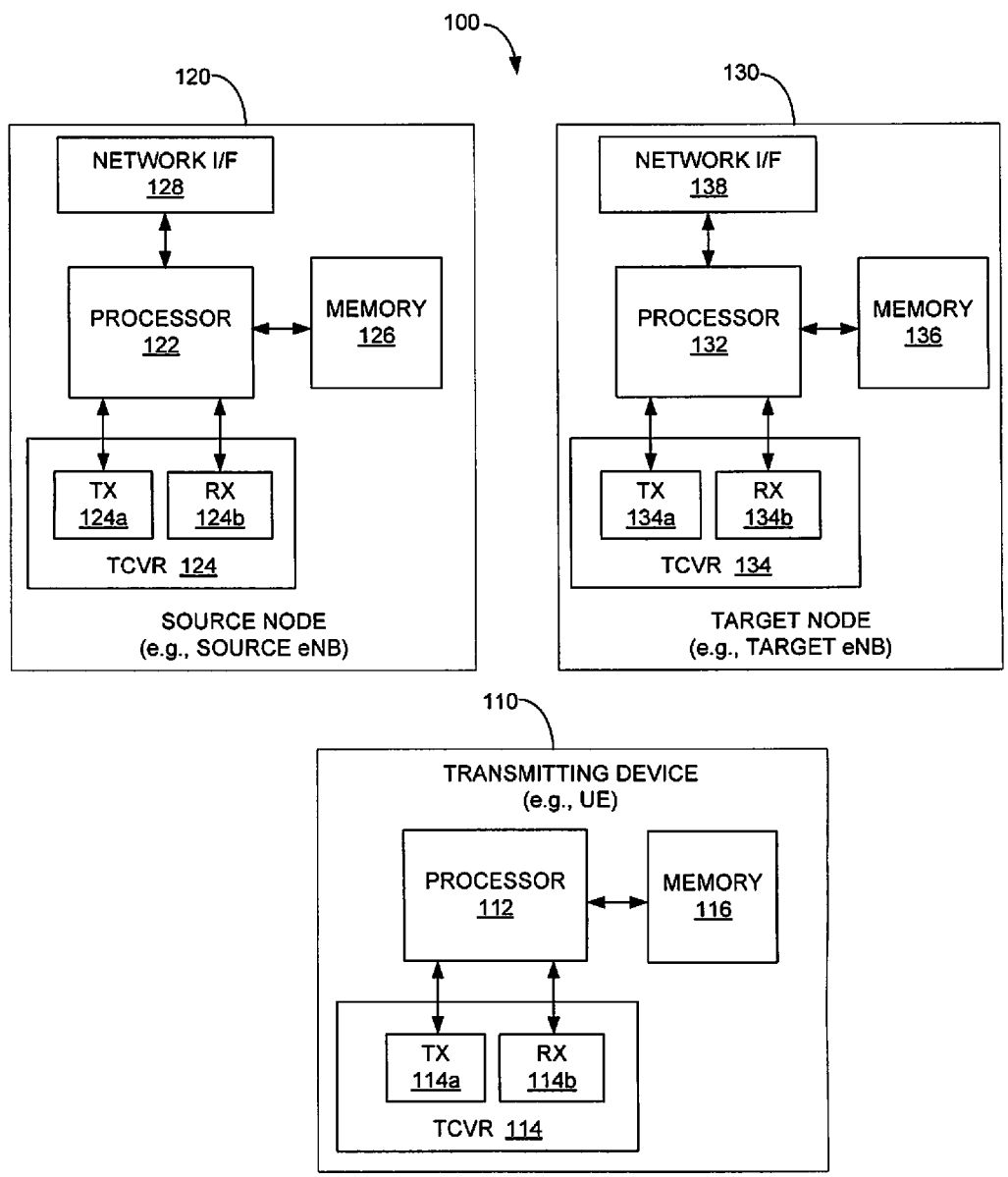
FIG. 1 shows an exemplary wireless network comprising a mobile device, a source node, and a target node.

FIG. 1 shows an exemplary wireless network 100 comprising UE 110, source eNB 120, and target eNB 130. The UE 110, source eNB 120, and target eNB 130 communicate according to known standards, e.g., LTE. While FIG. 1 shows only one UE 110, one source eNB 120, and one target eNB 130, it will be appreciated that network 100 may comprise any number of UEs and eNBs.

UE 110 comprises a processing circuit 112, transceiver 114, and memory 116. The processing circuit 112 controls the operation of the UE 110 according to instructions and programs stored in memory 116. Transceiver 114 comprises a transmitter 114a and a receiver 114b. Transmitter 114a/receiver 114b wirelessly transmit/receive signals to/from a remote network node, e.g., an eNB 120, 130, according to any known wireless standard, e.g., LTE.

Source eNB 120 comprises a processing circuit 122, transceiver 124, memory 126, and network interface (I/F) 128. The processing circuit 122 controls the operation of the source eNB 120 according to instructions and programs stored in memory 126. Transceiver 124 comprises a transmitter 124a and a receiver 124b. Transmitter 124a/receiver 124b wirelessly transmit/receive signals to/from a remote device, e.g., UE 110, and network I/F 128 communicates with other network nodes, e.g., target eNB 130, according to any known standard, e.g., LTE.

Target eNB 130 comprises a processing circuit 132, transceiver 134, memory 136, and network interface (I/F) 138. The processing circuit 132 controls the operation of the target eNB 130 according to instructions and programs stored in memory 136. Transceiver 134 comprises a transmitter 134a and a receiver 134b. Transmitter 134a/receiver 134b wirelessly transmit/receive signals to/from a remote device, e.g., UE 110, and network I/F 138 communicates with other network nodes, e.g., source eNB 120, according to any known standard, e.g., LTE.

The UE 110 communicates with the source eNB 120 according to conventional protocols. Per RAN2, UE 110 may send assistance information to the source eNB 120 to achieve some desired objective, e.g., requesting a different connection configuration to save power. For example, during an ongoing data session when the UE 110 is RRC connected and time aligned (presumably when it has mostly background type of traffic, e.g., small, infrequent data packets), the UE 110 may request a new configuration to reduce its power consumption. This request may take the form of a single bit, referred to as Power Preference Indicator (PPI), transmitted to the source eNB 120.

The UE 110 may provide the assistance information to the source eNB 120 in the form of a status report. It will be appreciated that the assistance information provided by the UE 110 to the source eNB 120 is not limited to the PPI. The status report may include one or more values indicating one or more setting preferences for the UE 110, indicating a current status of one or more UE functions or UE hardware elements, and/or indicating a problem being experienced by the UE 110. Exemplary setting preferences include but are not limited to a discontinuous reception setting preference for the UE 110 (e.g., to indicate the UE's willingness for delay sensitive or delay tolerant operation), a power preference for the UE 110, a priority preference for a service associated with the UE 110, a connection configuration preference for the UE 110, and a tolerance preference regarding delay sensitive operations for the UE 110. Exemplary statuses include but are not limited to an on/off status of a screen of the UE 110, an on/off status of a location function (e.g., a Global Positioning System (GPS) function), an on/off status of the transmitter 114a, etc. Exemplary problems that may be reported by the UE 110 using the status report include an indication of a low or soon to be exhausted battery. Thus, the UE 110 only provides a status report to the source eNB 120 at predetermined time intervals, and then only when the assistance information changes.

Figure 2:
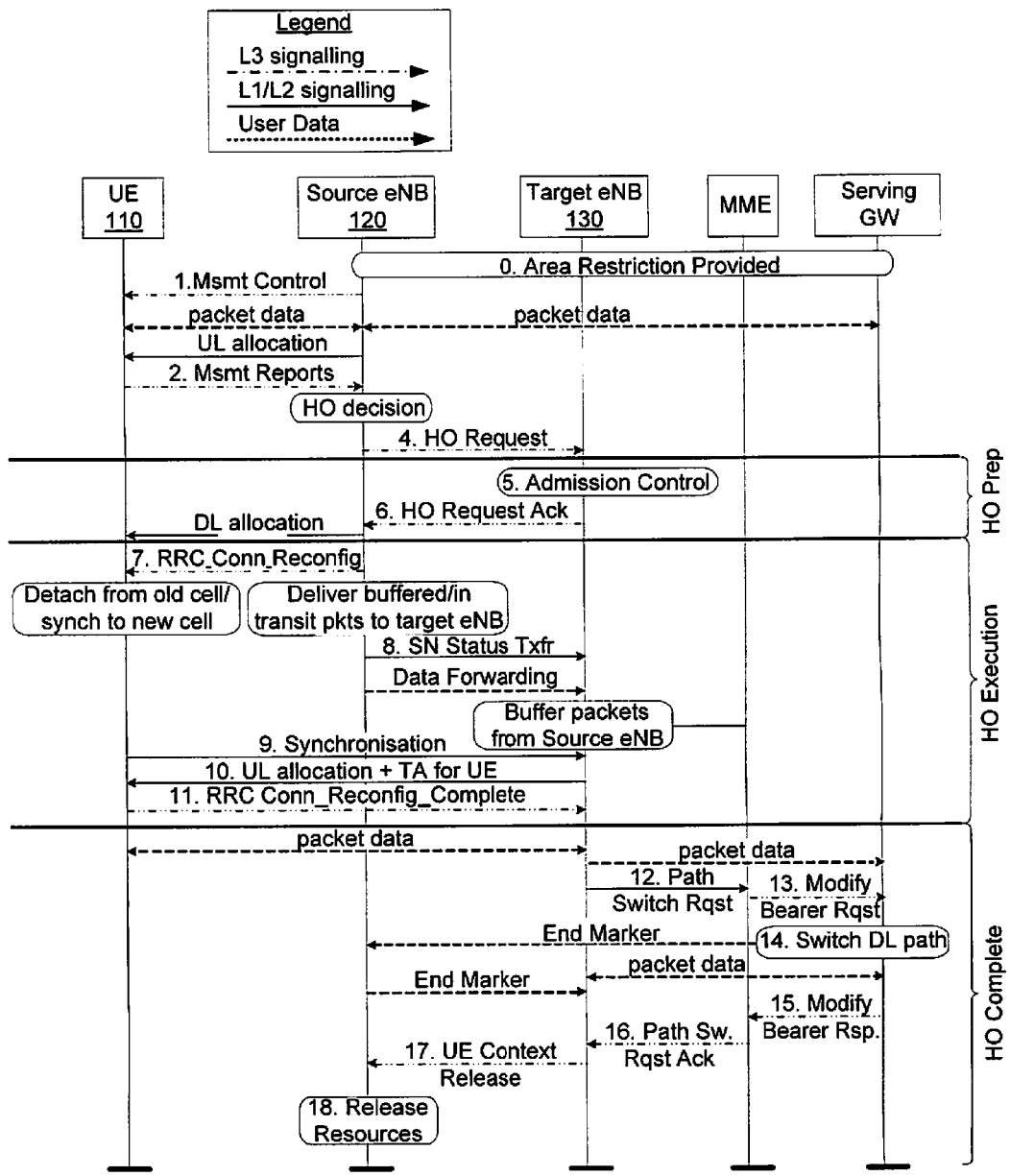
FIG. 2 shows an exemplary a signaling diagram for one exemplary handover procedure.

As previously noted, the special circumstances created by handover do not lend themselves to the solutions applicable to non-handover operations. To overcome these problems without creating more signaling, the solution disclosed herein uses existing handover-related messages to synchronize a UE status with the target eNB 120. FIG. 2 shows an exemplary signaling diagram for wireless communications before, during, and after handover of UE 110 from a source eNB 129 to a target eNB 130. To better illustrate the solution disclosed herein, the following first describes the basic signaling associated with an LTE handover, and the corresponding problems associated with synchronizing the UE assistance information.

Before handover, the source eNB 120 sends measurement control data to the UE 110 (step 1), exchanges packet data with the UE 110, and sends uplink allocation information to the UE 110. The UE 110 continues communicating with the source eNB 120 until the source eNB 120 makes a handover decision (step 3), e.g., based on signal strength measurement reports provided to the source eNB 120 by the UE 110 (step 2). Responsive to the handover decision (step 3), the source eNB 120 sends a handover request to the target eNB 130 (step 4), at which point handover preparation begins.

During handover preparation, the target eNB 130 performs admission control, e.g., provides information on available resources in the target cell (step 5). If the resources available in the target cell are not able to carry the service after handover, then handover to the target cell is rejected. If the available resources are able to carry the service after handover, the target eNB 130 sends a handover request acknowledgement to the source eNB 120 (step 6) to complete handover preparation.

Now that handover preparation is complete, handover execution begins. Handover execution includes the UE 110 receiving, from the source eNB 120, downlink allocation information using L1/L2 signaling and a Radio Resource Control (RRC) reconfiguration message, e.g., an RRC_Connection_Reconfiguration message, to the UE 110 using L3 signaling (step 7). Handover execution continues with the UE 110 detaching from the source eNB 120 and synchronizing to the target eNB 130, and the source eNB delivering buffered and in-transit data packets to the target eNB 130 (steps 8-10). Upon completion of these steps, the UE 110 sends an RRC reconfiguration message, e.g., an RRC_Connection_Reconfiguration_Complete message, to the target eNB 130 using L3 signaling (step 11). Upon completion of handover execution, the UE 110 and target eNB 130 communicate according to conventional protocols, e.g., by exchanging packet data between the UE 110 and the target eNB 130, until the communication session ends (steps 12-18).

In an attempt to provide the UE 110 and the target eNB 130 with the same UE status information upon handover completion, conventional systems may have the source eNB 120 forward the latest UE status report to the target eNB 130. Thus, the UE 110 does not have to use conventional protocols to transmit its status to the target eNB 130 upon handover completion. However, if the UE 110 sends a status report to the source eNB 120 before the handover is executed but after the source eNB 120 forwards the preceding status report to the target eNB 130, there may be a mismatch between the UE's current status report and the target eNB's perception of the UE's current status report.

Figure 3:
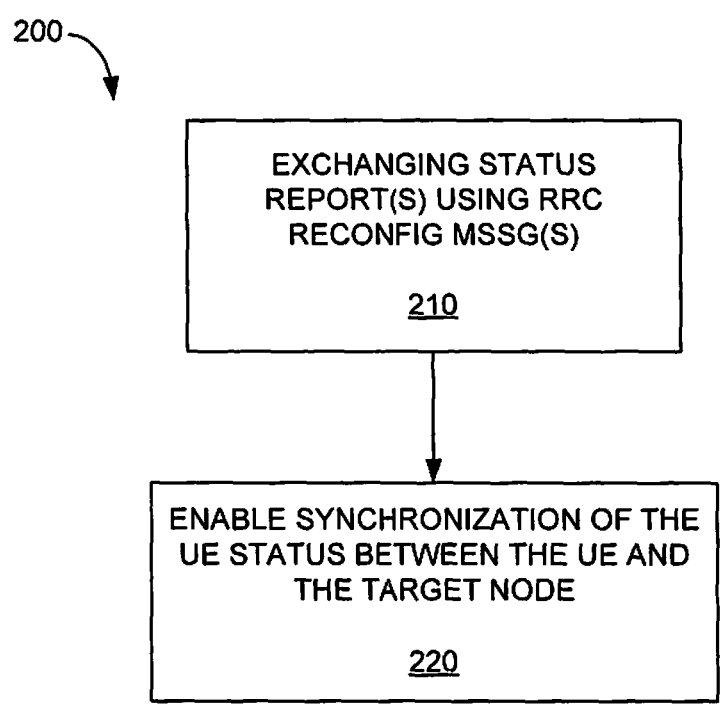
FIG. 3 shows an exemplary method for implementation by the mobile device and/or one or both of the target and source nodes.

FIG. 3 shows one exemplary solution 200 for addressing the synchronization problems of the conventional solutions. The solution 200 disclosed herein synchronizes the UE's and target eNB's perception of the UE status report, e.g., the UE's preference on the priority of a certain service that it requests, the UE's reporting on certain problems that it experiences which the receiving node cannot otherwise be aware of, the UE's preference for a certain type of connection configuration after the handover, etc. To avoid excessive signaling issues, the solution disclosed herein uses existing handover messages to exchange the UE status report after the source eNB 120 makes a handover decision. More particularly, the UE 110 and the target eNB 130 exchange at least one status report responsive to the handover decision using at least one RRC reconfiguration message (block 210). The status report(s) exchanged using the RRC reconfiguration message(s) enable the UE 110 and/or the target eNB 130 to have the same UE status report (block 220). It will be appreciated that the disclosed solution is applicable to the previously discussed eDDA WI.

One exemplary embodiment uses a message to exchange the UE status report(s) generated during handover preparation, and thus, to synchronize the UE status with the target eNB's perception of the UE status. In this embodiment, the target eNB 130 reports its perception of the UE's status to the UE via the source eNB 120 during handover preparation so that the UE 110 becomes aware of the target eNB's perception and synchronizes itself with the target eNB 130. More particularly, the processing circuit 132 in the target node 130 generates a handover preparation status report based on the target eNB's perception of the UE's status stored in the memory 136 of the target node 130 during handover preparation. The handover preparation status report indicates the target eNB's perception of the current UE assistance information. A transmitter 134a in the target eNB 130 transmits the handover preparation status report to the source eNB 120. The network I/F 128 in the source eNB 120 receives the handover preparation status report. To convey the handover preparation status report to the UE 110 without using any additional signaling, processing circuit 122 in the source eNB 120 adds the handover preparation status report to an RRC reconfiguration message, e.g., the RRC_Connection_Reconfiguration message (e.g., step 7 in FIG. 2), which also includes the mobility control information. Transmitter 124a transmits the RRC reconfiguration message from the source eNB 120 to the UE 110. The receiver 114b in UE 110 receives the RRC reconfiguration message, and processing circuit 112 extracts the handover preparation status report from the received RRC reconfiguration message. In response to the handover preparation status report, the processing circuit 112 in the UE 110 sets the UE status according to the target eNB's perceived UE status. Subsequently, the processing circuit 112 in the UE 110 maintains this status for the duration of the handover, e.g., until after the UE 110 sends the RRC_Connection_Reconfiguration_Complete message to the target eNB 130, to synchronize the UE's status at the UE 110 and the target node 130.

Another exemplary embodiment uses a message to exchange the UE status report(s) generated during handover execution. Thus, the second embodiment allows the UE 110 to report its latest power preference status to the target eNB 130 during handover execution. In this embodiment, the UE 110 reports its latest status to the target eNB 130 during handover execution so that the target eNB 130 becomes aware and synchronizes itself with the UE 110. To convey the UE status without using any additional signaling, the processing circuit 112 in the UE 110 generates a handover execution status report based on a status of the mobile device 110 stored in memory 116, and adds the generated handover execution status report to an RRC reconfiguration message, e.g., the RRC_Connection_Reconfiguration_Complete message (e.g., step 11 in FIG. 2) during handover execution. The transmitter 114a in the UE 110 transmits the RRC reconfiguration message to the target eNB 130 during handover execution to convey the handover execution status report to the target node 130. Further, the processing circuit 112 maintains the status associated with the handover execution status report for the duration of the handover. The receiver 134b in the target eNB 130 receives the RRC reconfiguration message, and processing circuit 132 extracts the handover execution status report from the received RRC reconfiguration message. Responsive to the handover execution status report, the processing circuit 132 in the target eNB 130 sets its UE status equal to that of the handover execution status report to synchronize the UE's status at the UE 110 and the target node 130. Because the handover execution status report included with the RRC reconfiguration message includes the UE assistance information, this embodiment may also enable the elimination of such information from the UE context.

Yet another exemplary embodiment uses messages generated during handover preparation and handover execution to exchange the UE status report(s). In this embodiment, the processing circuit 132 in the target node 130 generates a handover preparation status report based on the target eNB's perception of the UE's status stored in the memory 136 of the target node 130 during handover preparation. The handover preparation status report indicates the target eNB's perception of the current UE assistance information. A transmitter 134a in the target eNB 130 transmits the handover preparation status report to the source eNB 120. The network interface 128 in the source eNB 120 receives the handover preparation status report from the target eNB 130. To convey the handover preparation status report to the UE 110 without using any additional signaling, the processing circuit 122 in the source eNB 120 adds the received handover preparation status report to an RRC reconfiguration message, e.g., the RRC_Connection_Reconfiguration message (e.g., step 7 in FIG. 2). Transmitter 124a transmits the RRC reconfiguration message from the source eNB 120 to the UE 110. The receiver 114b receives the RRC reconfiguration message, and processing circuit 112 extracts the handover preparation status report from the received RRC reconfiguration message. In response to the handover preparation status report, the processing circuit 112 in the UE 110 sets the UE status according to the target eNB's perceived UE status and generates a handover execution status report. To convey the UE status to the target eNB 130 without using any additional signaling, the processing circuit 112 in the UE 110 adds the handover execution status report to another RRC reconfiguration message, e.g., the RRC_Connection_Reconfiguration_Complete message (e.g., step 11 in FIG. 2) during handover execution. The transmitter 114a in the UE 110 transmits the RRC reconfiguration message to the target eNB 130 during handover execution to convey the handover execution status report to the target node 130. The receiver 134b in the target eNB 130 receives the RRC reconfiguration message, and processing circuit 132 extracts the handover execution status report from the received RRC reconfiguration message. Responsive to the handover execution status report, the processing circuit 132 in the target eNB 130 sets its UE status equal to the handover execution status to synchronize the UE's status at the UE 110 and the target node 130.

The solution disclosed herein ensures the UE 110 and the target eNB 130 operate with the same UE assistance information upon completion of the handover. Hence the solution disclosed herein avoids a possible mismatch on the perception of the UE's status between the UE 110 and the target eNB 130. Further, by attaching such status reports to one or more RRC reconfiguration messages, the solution disclosed herein avoids the mismatch problems without using additional signaling.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method executed in a mobile device responsive to a handover decision regarding handover of the mobile device from a source node to a target node in a wireless network, the method comprising:
   exchanging a status report between the mobile device and the target node responsive to the handover decision using a Radio Resource Control (RRC) reconfiguration message, wherein the status report indicates a status of the mobile device; and
   synchronizing a first status of the mobile device stored in a mobile device memory in the mobile device with a second status of the mobile device stored in a target node memory in the target node based on the status report.

2. The method of claim 1 wherein:
   exchanging the status report comprises:
      generating a handover execution status report based on the first status of the mobile device during handover execution;
      adding the handover execution status report to the RRC reconfiguration message; and
      sending the RRC reconfiguration message to the target node to convey the handover execution status report to the target node; and
   synchronizing the first and second statuses of the mobile device comprises maintaining the first status of the mobile device stored in the mobile device memory according to the handover execution status report for the duration of the handover.

3. The method of claim 1 wherein:
   exchanging the status report comprises receiving the RRC reconfiguration message from the source node, the received RRC reconfiguration message including a handover preparation status report generated by the target node during handover preparation based on a perception, by the target node, of the second status of the mobile device; and
   synchronizing the first and second statuses of the mobile device comprises setting the first status of the mobile device stored in the mobile device memory according to the handover preparation status report for the duration of the handover.

4. The method of claim 1 wherein:
   exchanging the status report comprises:
      receiving a first RRC reconfiguration message from the source node, the first RRC reconfiguration message including a handover preparation status report generated by the target node during handover preparation based on a perception, by the target node, of the second status of the mobile device;

generating a handover execution status report based on the first status of the mobile device during handover execution;

adding the handover execution status report to a second RRC reconfiguration message; and sending the second RRC reconfiguration message to the target node to convey the handover execution status report to the target node; and synchronizing the first and second statuses of the mobile device comprises synchronizing the first and second statuses of the mobile device according to the handover preparation status report and the handover execution status report.

5. The method of claim 1 wherein the RRC reconfiguration message comprises at least one of an RRC_Connection_Reconfiguration message received from the source node and an RRC_Connection_Reconfiguration_Complete message transmitted to the target node.

6. The method of claim 1 wherein the status report includes one or more values indicating at least one of a problem experienced by the mobile device, a current status of at least one function or hardware element of the mobile device, and one or more setting preferences of the mobile device.

7. The method of claim 6 wherein the one or more setting preferences comprise at least one of:
a discontinuous reception setting preference for the mobile device;
a power preference for the mobile device;
a priority preference for a service associated with the mobile device;
a connection configuration preference for the mobile device; and
a tolerance preference regarding delay sensitive operations for the mobile device.

8. A mobile device in a wireless network comprising:
a transceiver configured to exchange a status report between the mobile device and a target node in the wireless network responsive to a handover decision using a Radio Resource Control (RRC) reconfiguration message, wherein the status report indicates a status of the mobile device, and wherein the handover decision represents a decision to handover the mobile device from a service node to the target node;
a mobile device memory configured to store a first status of the mobile device; and
a processing circuit configured to synchronize the first status of the mobile device with a second status of the mobile device stored in a target node memory in the target node based on the exchanged status report.

9. The mobile device of claim 8 wherein:
the processing circuit is further configured to:
generate a handover execution status report based on the first status of the mobile device during handover execution; and
add the handover execution status report to the RRC reconfiguration message;
the transceiver is configured to exchange the status report by sending the RRC reconfiguration message to the target node to convey the handover execution status report to the target node; and
the processing circuit is configured to synchronize the first and second statuses by maintaining the first status of the mobile device stored in the mobile device memory according to the handover execution status report for the duration of the handover.

10. The mobile device of claim 8 wherein:
the transceiver is configured to exchange the status report by receiving the RRC reconfiguration message from the source node, the received RRC reconfiguration message including a handover preparation status report generated by the target node during handover preparation based on a perception, by the target node, of the second status of the mobile device; and
the processing circuit is configured to synchronize the first and second statuses by setting the first status of the mobile device stored in the mobile device memory according to the handover preparation status report for the duration of the handover.

11. The mobile device of claim 8 wherein:
the transceiver is configured to exchange the status report by receiving a first RRC reconfiguration message from the source node, the first RRC reconfiguration message including a handover preparation status report generated by the target node during handover preparation based on a perception, by the target node, of the second status of the mobile device;
the processing circuit is further configured to:
generate a handover execution status report based on the first status of the mobile device during handover execution; and
add the handover execution status report to a second RRC reconfiguration message;
the transceiver is configured to exchange the status report by sending the second RRC reconfiguration message to the target node to send the handover execution status report to the target node; and
the processing circuit is configured to synchronize the first and second statuses by synchronizing the first and second statuses according the handover preparation status report and the handover execution status report.

12. The mobile device of claim 8 wherein the RRC reconfiguration message comprises at least one of an RRC_Connection_Reconfiguration message received from the source node and an RRC_Connection_Reconfiguration_Complete message transmitted to the target node.

13. The mobile device of claim 8 wherein the status report includes one or more values indicating at least one of a problem experienced by the mobile device, a current status of at least one function or hardware element of the mobile device, and one or more setting preferences of the mobile device.

14. The mobile device of claim 13 wherein the one or more setting preferences comprise at least one of:
a discontinuous reception setting preference for the mobile device;
a power preference for the mobile device;
a priority preference for a service associated with the mobile device;
a connection configuration preference for the mobile device; and
a tolerance preference regarding delay sensitive operations for the mobile device.

15. A method executed by a network node responsive to a handover decision regarding handover of a mobile device from a source node to a target node in a wireless network, the method comprising:
exchanging a status report between the mobile device and the target node responsive to the handover decision using a Radio Resource Control (RRC) reconfiguration message, wherein the status report indicates a status of the mobile device; and
enabling synchronization between a first status of the mobile device stored in a mobile device memory in the mobile device and a second status of the mobile device stored in a target node memory in the target node based on the status report.

16. The method of claim 15:
wherein the network node comprises the target node; and
wherein exchanging the status report comprises receiving the RRC reconfiguration message from the mobile device, wherein the received RRC reconfiguration message includes a handover execution status report generated during handover execution and indicating a current status of the mobile device;
the method further comprising synchronizing the current status of the mobile device with the second status of the mobile device based on the handover execution status report.

17. The method of claim 15 wherein:
the network node comprises the source node; and
exchanging the status report comprises:
receiving a handover preparation status report from the target node during handover preparation, the handover preparation status report indicating the first status of the mobile device representing a status of the mobile device as perceived by the target node during the handover preparation;
adding the handover preparation status report to the RRC reconfiguration message; and
sending the RRC reconfiguration message to the mobile device, thereby conveying the handover preparation status report to the mobile device.

18. The method of claim 15:
wherein the network node comprises the target node:
wherein exchanging the status report comprises:
generating a handover preparation status report based on the first status of the mobile device representing a status of the mobile device as perceived by the target node during handover preparation;
sending the handover preparation status report to the source node to enable the source node to forward the handover preparation status report to the mobile device as part of a first RRC reconfiguration message; and
receiving, from the mobile device, a second RRC reconfiguration message generated during handover execution, the second RRC reconfiguration message including a handover execution status report indicating the second status of the mobile device representing a current status of the mobile device; and
the method further comprising synchronizing the first and second statuses of the mobile device according to the handover execution status report and the handover preparation status report.

19. The method of claim 15 wherein the RRC reconfiguration message comprises at least one of an RRC_Connection_Reconfiguration message transmitted from the source node to the mobile device and an RRC_Connection_Reconfiguration_Complete message transmitted from the mobile device to the target node.

20. The method of claim 15 wherein the status report includes one or more values indicating at least one of a problem experienced by the mobile device, a current status of at least one function or hardware element of the mobile device, and one or more setting preferences of the mobile device.

21. The method of claim 20 wherein the one or more setting preferences comprise at least one of:
a discontinuous reception setting preference for the mobile device;
a power preference for the mobile device;
a priority preference for a service associated with the mobile device;
a connection configuration preference for the mobile device; and
a tolerance preference regarding delay sensitive operations for the mobile device.

22. A network node in a wireless network comprising:
at least one of a transceiver and a network interface configured to exchange a status report between a mobile device and a target node responsive to a handover decision using a Radio Resource Control (RRC) reconfiguration message;
wherein the status report indicates a status of the mobile device;
wherein the handover decision represents a decision to handover the mobile device from a source node to the target node; and
a processing circuit configured to enable synchronization between a first status of the mobile device stored in a mobile device memory in the mobile device and a second status of the mobile device stored in a target node memory in the target node based on the status report.

23. The network node of claim 22:
wherein the network node comprises the target node;
wherein the transceiver exchanges the status report by receiving the RRC reconfiguration message from the mobile device, wherein the received RRC reconfiguration message includes a handover execution status report generated during handover execution and indicating a current status of the mobile device;
wherein the processing circuit is further configured to synchronize the current status of the mobile device with the second status of the mobile device based on the handover execution status report.

24. The network node of claim 22 wherein:
the network node comprises the source node;
the network interface is configured to exchange the status report by receiving a handover preparation status report from the target node during handover preparation, the handover preparation status report indicating the first status of the mobile device representing a status of the mobile device as perceived by the target node during the handover preparation;
the processing circuit is further configured to add the handover preparation status report to the RRC reconfiguration message; and
the transceiver is configured to exchange the status report by sending the RRC reconfiguration message to the mobile device, thereby conveying the handover preparation status report to the mobile device.

25. The network node of claim 22 wherein:
the network node comprises the target node;
the processing circuit is further configured to generate a handover preparation status report based on the first status of the mobile device representing a status of the mobile device as perceived by the target node during handover preparation;
the network interface is configured to exchange the status report by sending the handover preparation status report to the source node to enable the source node to forward the handover preparation status report to the mobile device as part of a first RRC reconfiguration message;
the transceiver is configured to exchange the status report by receiving, from the mobile device, a second RRC reconfiguration message generated during handover execution, the second RRC reconfiguration message including a handover execution status report indicating the second status of the mobile device representing a current status of the mobile device; and the processing circuit is further configured to synchronize the first and second statuses of the mobile device according the handover execution status report and the handover preparation status report.

26. The network node of claim 22 wherein the RRC reconfiguration message comprises at least one of an RRC_Connection_Reconfiguration message transmitted from the source node to the mobile device and an RRC_Connection_Reconfiguration_Complete message transmitted from the mobile device to the target node.

27. The network node of claim 22 wherein the status report includes one or more values indicating at least one of a problem experienced by the mobile device, a current status of at least one function or hardware element of the mobile device, and one or more setting preferences of the mobile device.

28. The network node of claim 27 wherein the one or more setting preferences comprise at least one of:
  a discontinuous reception setting preference for the mobile device;
  a power preference for the mobile device;
  a priority preference for a service associated with the mobile device;
  a connection configuration preference for the mobile device; and
  a tolerance preference regarding delay sensitive operations for the mobile device.

\* \* \* \* \*